United States Patent
Asumi et al.

(12) 
(10) Patent No.: US 6,564,136 B2
(45) Date of Patent: May 13, 2003

(54) ACCELERATION CONTROL APPARATUS FOR VEHICLE

(75) Inventors: Michio Asumi, Saitama (JP); Kiyoyuki Sugano, Saitama (JP); Hirokazu Komuro, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/101,925

(22) Filed: Mar. 21, 2002

(65) Prior Publication Data
US 2002/0156565 A1 Oct. 24, 2002

(30) Foreign Application Priority Data
Mar. 28, 2001 (JP) ........................................ 2001-092579
Dec. 10, 2001 (JP) ........................................ 2001-376129

(51) Int. Cl.⁷ ............................................. B60K 23/04
(52) U.S. Cl. ........................................ 701/70; 701/68
(58) Field of Search ......................... 701/70, 67, 68, 701/51; 180/197; 477/44, 101, 107, 10, 115

(56) References Cited

U.S. PATENT DOCUMENTS

| | | | | |
|---|---|---|---|---|
| 4,740,898 A | * | 4/1988 | McKee et al. | ............... 701/70 |
| 5,431,242 A | * | 7/1995 | Iwata | .................. 180/197 |
| 5,548,513 A | * | 8/1996 | Masuda et al. | ............ 701/70 |
| 5,931,884 A | * | 8/1999 | Ochiai | ..................... 701/70 |

FOREIGN PATENT DOCUMENTS

JP      7-180644      7/1995

* cited by examiner

Primary Examiner—Richard M. Camby
(74) Attorney, Agent, or Firm—Birch, Stewart, Kolasch & Birch, LLP

(57) ABSTRACT

To improve the comfortability in riding by discriminating sudden acceleration upon startup before connection of a centrifugal clutch and limiting the engine output power. A supervision starting condition discrimination section discriminates whether or not an engine satisfies a supervision starting condition for starting discrimination of satisfaction of a starting control condition. The supervision starting condition is discriminated based on a vehicle speed, a throttle opening and an engine speed. Particularly, a condition at least of the engine speed from among the parameters such as the vehicle speed is set to a value lower than a speed at which a centrifugal clutch is connected. If the supervision starting condition discrimination section discriminates that the condition is satisfied, then a startup control condition discrimination section discriminates whether or not the vehicle is in a sudden acceleration state based on whether or not the throttle opening has a magnitude (for example, 50%) corresponding to a sudden opening of the throttle. If sudden opening of the throttle is detected, then an ignition retard section issues an instruction to an ignition timing control section to retard the ignition timing in order to limit the output power.

20 Claims, 5 Drawing Sheets

ACCELERATION CONTROL APPARATUS FOR VEHICLE

CROSS-REFERENCE TO RELATED APPLICATIONS

The present application claims priority under 35 USC 119 to Japanese Patent Application Nos. 2001-092579 filed on Mar. 28, 2001 and 2001-376129 filed on Dec. 10, 2001 the entire contents thereof is hereby incorporated by reference.

BACKGROUND OF THE INVENTION

1. Field of the Invention

This invention relates to an acceleration control apparatus for a vehicle, and more particularly to an acceleration control apparatus for a vehicle suitable to prevent an excessive sudden acceleration operation of the vehicle to improve the smoothness of the operation of the vehicle.

2. Description of Background Art

A motorcycle is known wherein sudden acceleration upon the starting of the operation of the vehicle is limited to achieve smooth acceleration. For example, in an acceleration control apparatus for a motorcycle disclosed in Japanese Patent Laid-Open No. Hei 7-180644, taking notice of the fact that, upon acceleration, the posture of a vehicle varies and a bifurcated member (front fork) for supporting the front wheel is extended, sudden acceleration is detected based on the degree of the extension of the front fork to retard the ignition timing.

The acceleration control apparatus described above has the following problems. First, since a space in which a sensor for detecting the extension amount of the front fork is to be provided is assured, the degree of freedom in the designing of a member around the fork to which the sensor is attached is deteriorated. Second, since the posture of the vehicle changes and a change occurs with the front fork only after sudden acceleration has occurred actually, the conventional acceleration control apparatus cannot achieve an object of, for example, preventing sudden acceleration to make a connection of a centrifugal clutch smooth, particularly to provide a smooth the state of the centrifugal clutch when connection begins. Third, since the degree of the extension of the front fork varies depending upon the number of passengers or the weight of a passenger or passengers even if the acceleration is the same, it is difficult to precisely set a reference value for the extension amount of the front fork to be used for discrimination of a sudden acceleration.

SUMMARY AND OBJECTS OF THE INVENTION

It is an object of the present invention, taking the subjects described above into consideration, to provide an acceleration control apparatus for a vehicle which prevents sudden acceleration of the vehicle to achieve a suitable acceleration state which provides a good comfortable ride of the vehicle.

In order to attain the object described above, according to the present invention, an accelerator controlling apparatus for a vehicle has a first characteristic in that it comprises supervision means for starting the supervision of a sudden acceleration when predetermined conditions corresponding to the start up of the vehicle are satisfied with regard to at least two selected from among a vehicle speed, a throttle opening and an engine speed, centrifugal clutch for interrupting driving force transmission between an engine and a driving wheel in response to the engine speed. An acceleration control means is provided for limiting the engine output power when the throttle opening during a period of the supervision by the supervision means reaches a predetermined value corresponding to sudden acceleration. According to the present invention, the engine speed which is one of the predetermined conditions for the startup, is set to a low speed region lower than a value at which the centrifugal clutch is connected.

Further, an acceleration control apparatus for a vehicle has a second characteristic in that the acceleration control means is ignition retard means which sets an ignition timing of a small angle of lead and maintains the ignition timing for a predetermined period of time, and has a third characteristic in that it comprises an ignition timing returning means for returning the ignition timing of the small angle of lead set by the ignition retard means stepwise to a normal ignition timing after lapse of the predetermined period of time.

Furthermore, according to the present invention, an acceleration control apparatus for a vehicle has a fourth characteristic in that the vehicle is a saddle type vehicle. In addition, the present invention is directed to a centrifugal clutch which is a dry centrifugal clutch.

According to the first to fourth characteristics, the presence or absence of a sudden acceleration is supervised based on the throttle opening for the predetermined period of time after it is determined that the predetermined conditions are satisfied and the vehicle is in a startup state. If a sudden opening of the throttle corresponding to sudden acceleration is detected, then the engine output power is limited.

The output power of the engine can be limited particularly before the connection of the centrifugal clutch and the feeling in the beginning of the connection of the centrifugal clutch can be improved. In addition, even if the control amount is increased, sudden acceleration can be limited without making the operation of the vehicle unstable because this does not have an influence on the feeling because the clutch is not yet connected. Further, the present invention is suitable for a saddle type vehicle for which the smoothness upon the startup is particularly required because the vehicle is light in weight.

According to another feature of the present invention, since not only a miniaturization of the clutch is possible but also a sudden acceleration from a half-clutch state which appears notably where a dry type centrifugal clutch is adopted can be moderated. Thus, a miniaturization of the clutch and prevention of a sudden acceleration can be achieved simultaneously.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 6:
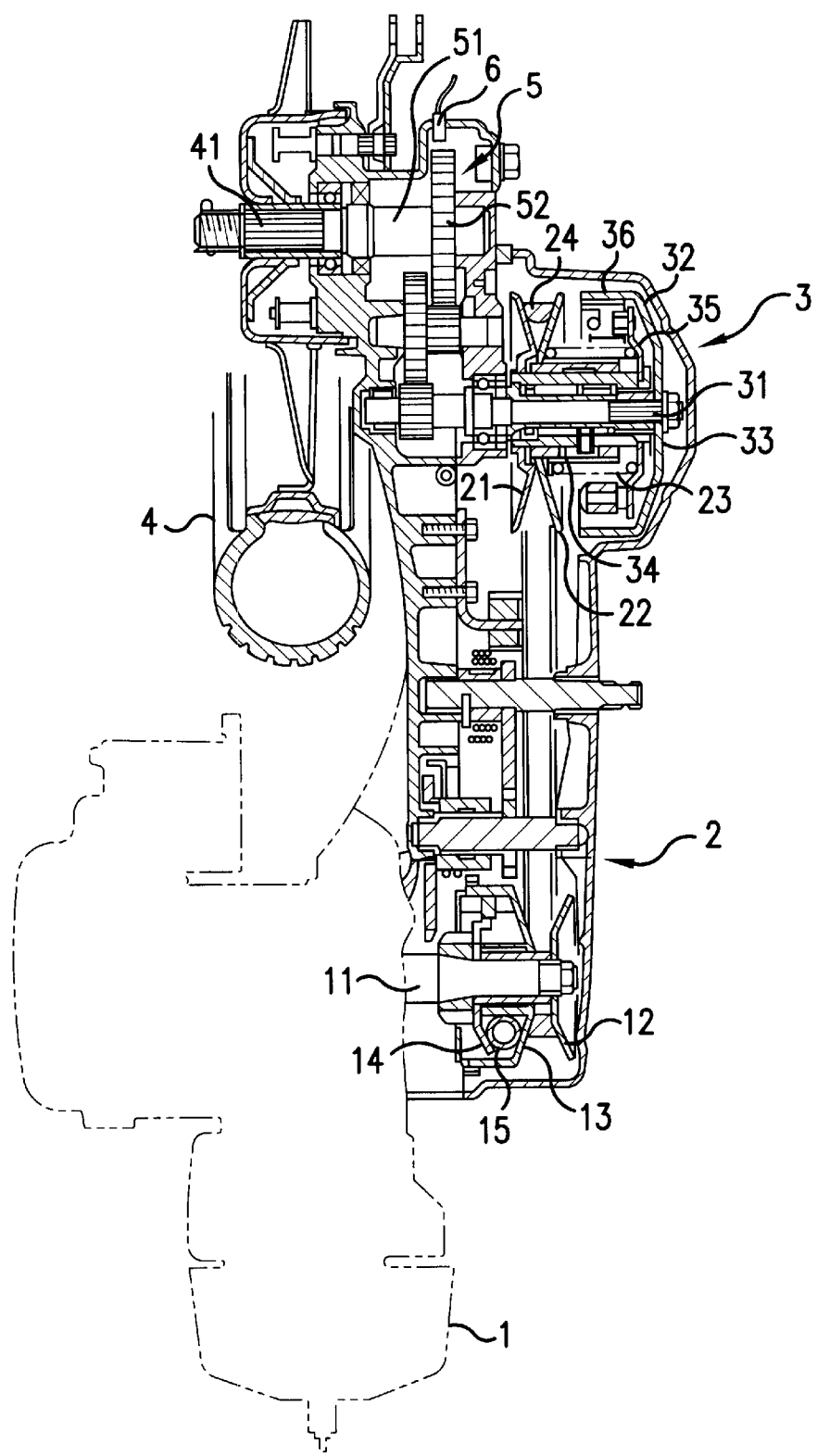
FIG. 6 is a sectional view of an automatic transmission.

In the following, an embodiment of the present invention is described with reference to the drawings. FIG. 6 is a sectional view of an automatic transmission for a motorcycle having an acceleration control apparatus for a vehicle according to an embodiment of the present invention. It is to be noted that the present invention can be applied not only to a motorcycle but also widely to a saddle type vehicle wherein a driver rides on a saddle such as a buggy.

Referring to FIG. 6, an output power of an engine 1 is transmitted to a centrifugal clutch 3 through a V-belt type automatic transmission apparatus 2 and is further transmitted to a rear wheel (driving wheel) 4 through the centrifugal clutch 3.

On an output power shaft or a drive shaft 11 (in the present embodiment, a crankshaft of the engine 1) are positioned a fixed face 12, a movable face 13 displaceable in an axial direction of the drive shaft 11 on the drive shaft 11, a ramp (inclined) plate 14, and a weight roller 15 disposed between the movable face 13 and the ramp plate 14 for displacement in a radial direction of the movable face 13 in response to the magnitude of centrifugal force. The fixed face 12 and the movable face 13 form a driving side V pulley.

A cup-shaped clutch outer member 32 is secured to an end of a shaft of the rear wheel side, that is, a driven shaft 31, and a boss 34 which is pivotal in a circumferential direction of the driven shaft 31 is provided on a hub 33 of the clutch outer member 32. A fixed face 21 is secured to one end of the boss 34. A movable face 22 is displaceable in a longitudinal direction of the boss 34, that is, in an axial direction of the driven shaft 31. The movable face 22 is biased to the fixed face 21 side by a coil spring 23. A clutch inner plate 35 is secured to the other end of the boss 34, and a clutch shoe 36 is mounted on the clutch inner plate 35. The fixed face 21 and the movable face 22 form a driven side V pulley. A V belt 24 extends between and around the driving side V pulley and the driven side V pulley.

The driven shaft 31 is connected to a shaft 41 of the rear wheel 4 through a gear train 5. A vehicle speed sensor 6 is provided in an opposing relationship to an outer circumferential face, that is, teeth, of a final gear 52 provided on a final shaft 51 of the gear train 5. The vehicle speed sensor 6 outputs, in response to projecting portions and recessed portions of the teeth of the final gear 52, different signals when an addendum portion is opposed to it and when a bottom is opposed to it. In other words, the vehicle speed sensor 6 outputs a signal which varies in response to the shape of a tooth upon rotation of the final gear 52. This signal is binary digitized in accordance with a threshold by a control section not shown and, as a result, it is converted into a pulse signal train in accordance with the rotation of the final gear 52. The number of such pulse signals within a predetermined period is a function of the vehicle speed and represents the vehicle speed. It is to be noted that an engine speed sensor (not shown) for detecting the speed of rotation of the drive shaft 11 is provided in the engine 1.

Upon operation, when a centrifugal force acts upon the weight roller 15 in response to the speed of rotation of the engine I so that the weight roller 15 is displaced in a radial direction of the driving side V pulley, the distance between the fixed face 12 and the movable face 13 varies. In response to the distance, the winding diameters of the V belt 24 on the driving side V pulley and the driven side V pulley vary, and the transmission gear ratio varies.

When the speed of rotation of the engine 1 rises and the speed of rotation of the driven side V pulley reaches a predetermined value, the clutch shoe 36 contacts with a force higher than a predetermined value with the clutch outer member 32 and the rotation is transmitted to the driven shaft 31 so that the rear wheel 4 is driven. Further, if an engine speed with which the centrifugal force of the weight roller 15 exceeds suppression force by the coil spring 23, then the weight roller 15 begins its displacement and the transmission gear ratio changes.

Figure 7:
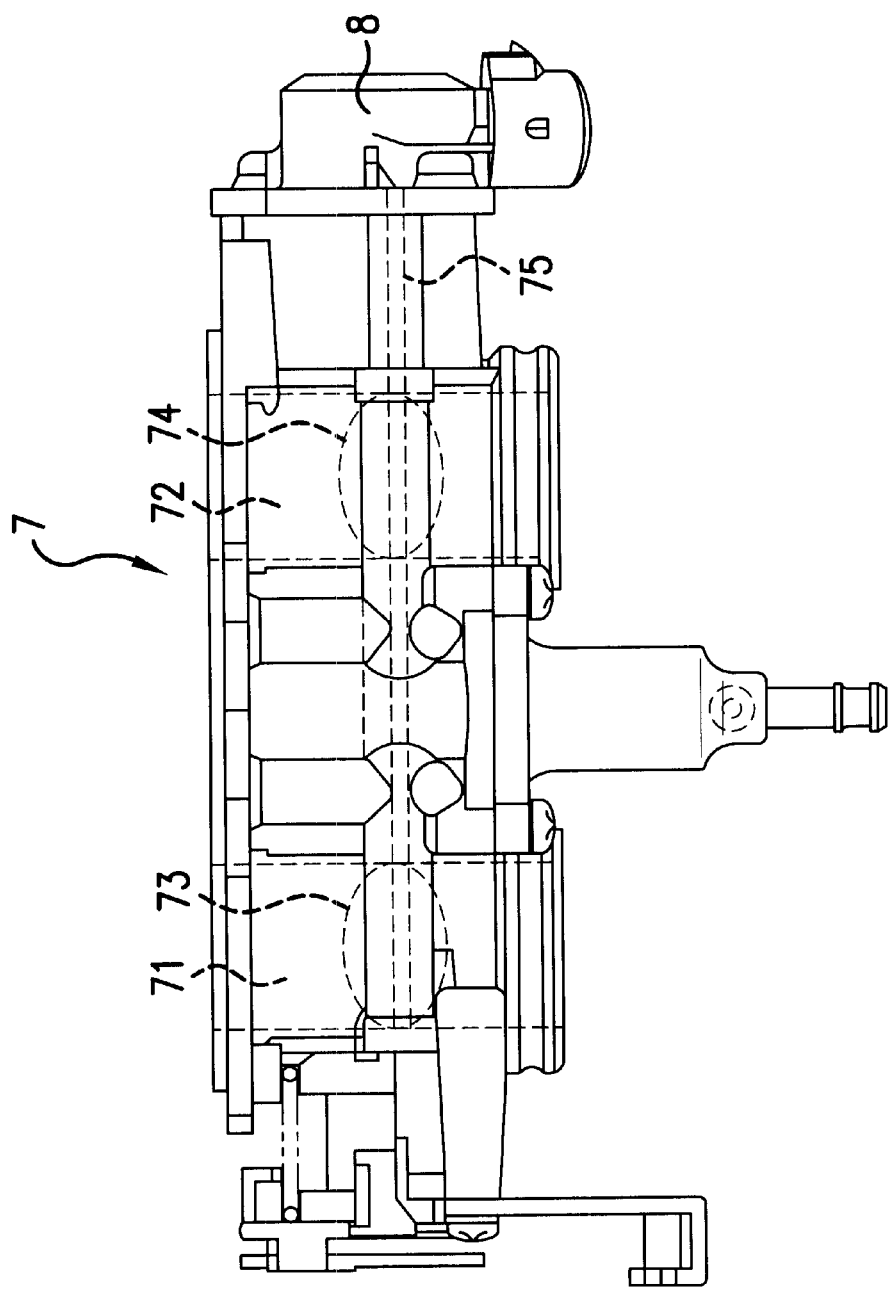
FIG. 7 is a plan view of a throttle body.

A throttle body is provided for an intake manifold of the engine 1 of the motorcycle in which the automatic transmission apparatus described above is incorporated. FIG. 7 is a plan view of the throttle body. The throttle body 7 is of the double type having two passages. Throttle valves 73 and 74 are provided for the passages 71 and 72, respectively. The throttle valves 73 and 74 have a common support shaft 75, and a throttle sensor 8 for detecting the position of the support shaft 75 in its direction of rotation is provided at an end portion of the support shaft 75. The throttle sensor 8 outputs a signal of a voltage value corresponding to the rotational position of the support shaft 75. This signal represents the opening of the throttle valves 73 and 74 coupled to the support shaft 75, and is converted into a digital signal by an A/D converter not shown and supplied to a microcomputer of the control apparatus.

Figure 1:
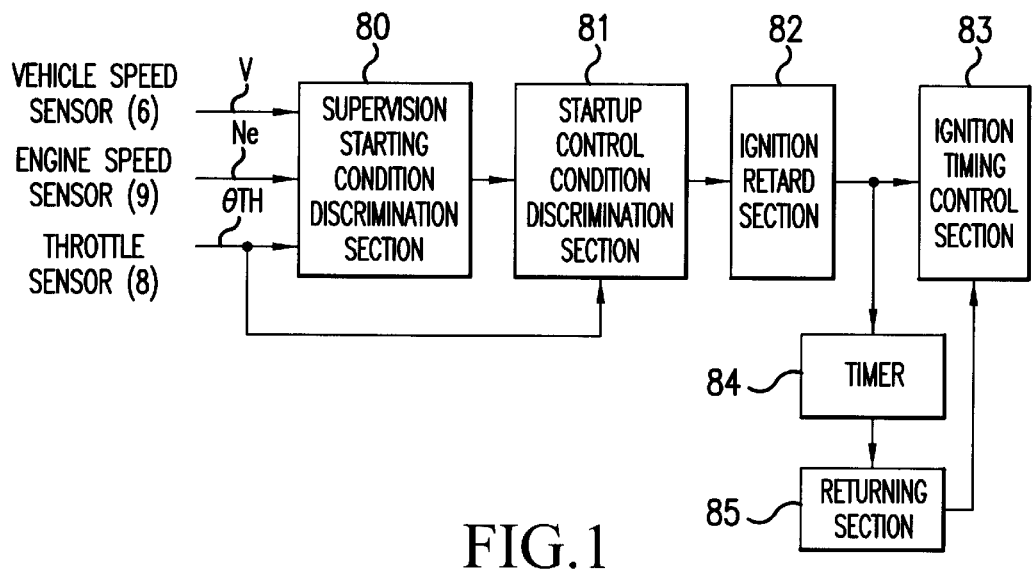
FIG. 1 is a block diagram showing the functions of essential parts of a control apparatus according to an embodiment of the present invention.

Now, the acceleration control of the motorcycle described above is described. FIG. 1 is a block diagram illustrating an outline of the acceleration control. Referring to FIG. 1, a supervision starting condition discrimination section 80 discriminates whether or not a supervision starting condition (first condition) for starting discrimination of satisfaction of a starting control condition is satisfied. The first condition is discriminated based on a vehicle speed V, a throttle opening θTH and an engine speed Ne earlier by a predetermined time than the present point of time based on detection signals of the vehicle speed sensor 6, throttle sensor 8 and engine speed sensor 9.

More particularly, when the speed Ne of the engine 1 is in a low rotation region (for example, several hundreds to two or three thousand, or approximately 500 to 2500 rpm) and the throttle opening θTH is a low opening (for example, lower than ten and several percent of that in the fully open state, or approximately 0 to 16%) and besides the vehicle speed V is a low speed (for example, lower than ten and several kilometers per hour, or approximately 0 to 10 km/h). In other words, when the engine speed Ne is in an idling rotation region and the throttle opening θTH is a small opening corresponding to the starting of the opening and the vehicle speed V is a low speed corresponding to the starting of an increase, the first condition is satisfied. It is to be noted that the first condition described above may otherwise be whether or not, from among the parameters such as the vehicle speed V described above, at least the condition of the engine speed Ne is lower than the speed of rotation when the centrifugal clutch 3 described above is connected.

A startup control condition discrimination section 81 discriminates whether or not the motorcycle is in a sudden acceleration state wherein a startup control condition (second condition) is satisfied based on whether or not the throttle opening θTH has a magnitude corresponding to a sudden opening (for example, several tens percent of that in the full open state and up to 50%) for a predetermined time (supervision time) T1 after it is discriminated by the supervision starting condition discrimination section 80 that the first condition is satisfied.

An ignition retard section 82 retards the ignition timing (retards the ignition) in order to limit the output power when sudden opening of the throttle is detected within the predetermined supervision time T1 described above, that is, when the second condition is satisfied. More particularly, the ignition retard section 82 issues an instruction to an ignition timing control section 83 so that the angle of lead may be reduced (in an example, set to the angle several degrees smaller or an angle of lead of 7°) from a normal angle of lead.

An ignition regard keeping time (startup control duration T2) is set in advance to a timer 84. After the startup control duration T2 elapses, a returning section 85 that serves as the ignition timing returning means is excited. The returning section 85 issues an instruction to the ignition timing control section 83 to perform an ignition returning process by increasing the angle of lead of the ignition timing.

Figure 2:
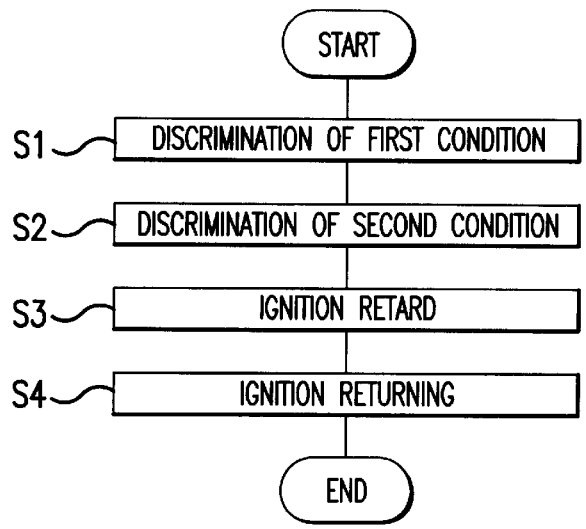
FIG. 2 is a flow chart illustrating an outline of a process of the control apparatus according to the embodiment of the present invention.

A flow chart illustrating an outline of the startup control is shown in FIG. 2. In step S1, it is discriminated whether or not the first condition is satisfied. If the first condition is satisfied, then in step S2, it is discriminated whether or not the second condition is satisfied. If the second condition is satisfied within the supervision time T1 for discrimination of the second condition, then the processing advances to step S3, in which the ignition timing is retarded (the ignition is retarded) to suppress the sudden acceleration. If the startup control duration T2 elapses, then an ignition returning process for returning the angle of lead to an ordinary value is performed in step S4. The startup control duration T2 described above is, for example shorter than 1 second, or approximately 0.5 seconds.

Figure 3:
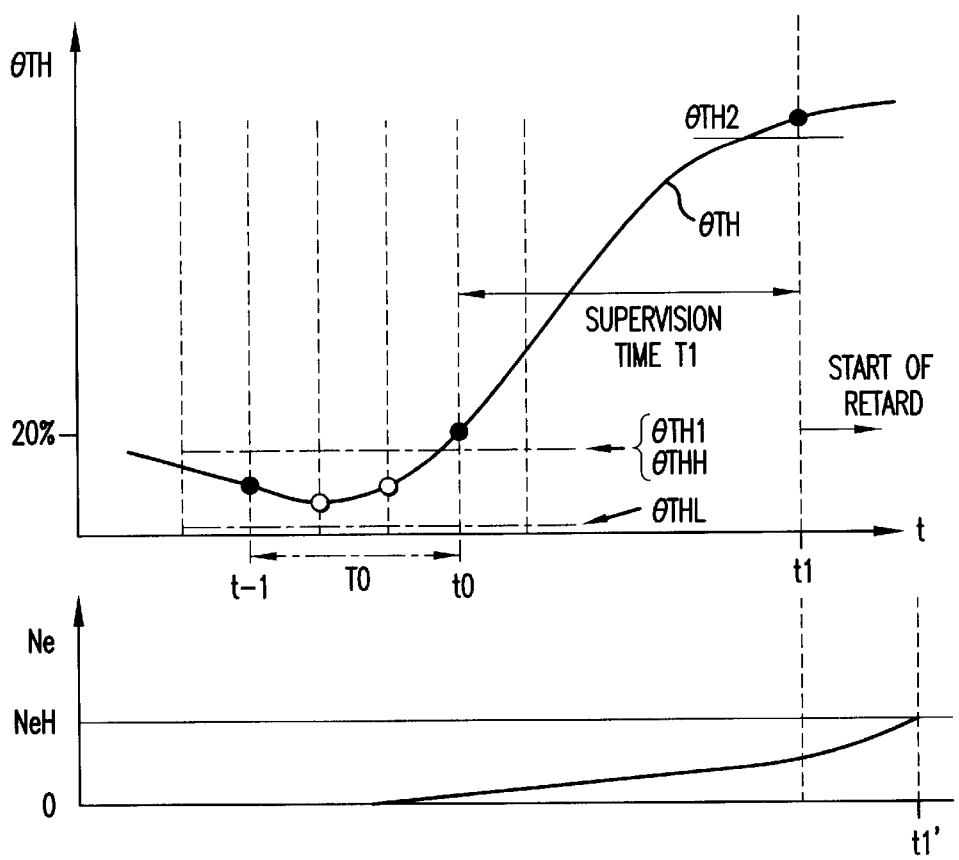
FIG. 3 is a graph illustrating variations of the vehicle speed and the throttle opening.

FIG. 3 is a view illustrating a particular example of the discriminations of whether or not the first and second conditions are satisfied based on the throttle opening θTH. It is assumed that, referring to FIG. 3, the throttle opening θTH varies as indicated by a curve as the time passes and the present point of time is a timing to. If the first condition described above is satisfied at a timing t-1 earlier 30 milliseconds than the present point t0 of time, for example 30 milliseconds, then the supervision time T1 is provided beginning from the present point t0 of time, for example one second, and if a sudden opening is detected from a throttle opening θTH greater than a predetermined opening within the supervision time T1, then the ignition timing is retarded (the ignition is retarded). In the present example, since the throttle opening θTH has already reached a reference value θTH2 (before the interrupt process time t1, for example, 50%) for sudden opening discrimination before the interrupt process timing t1, ignition retard is started at the timing t1.

It is to be noted that FIG. 3 additionally illustrates a variation of the engine speed Ne. The engine speed Ne rises as the throttle opening θTH increases, and at a timing t1' later than the starting timing t1 for the ignition retard, that is, when the engine speed Ne rises to NeH, the centrifugal clutch or start up clutch 3 enters a connection starting state.

Figure 4:
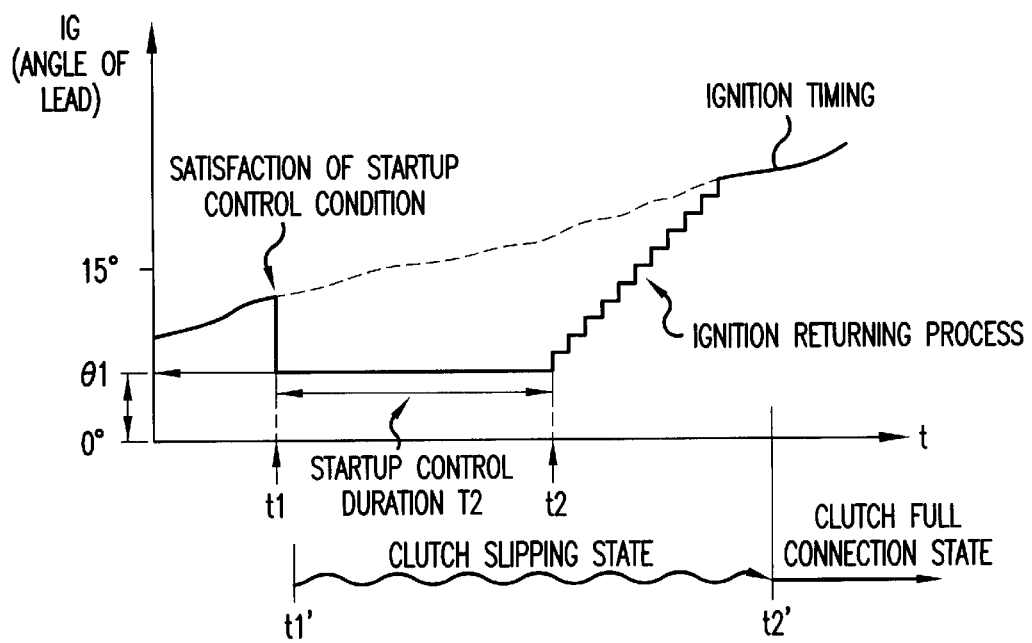
FIG. 4 is a graph illustrating a variation of the ignition timing (angle of lead) during startup control.

FIG. 4 is a view illustrating a variation of the ignition lead angle as the time passes. Referring to FIG. 4, the angle of lead gradually increases after the starting of the engine, and when the second condition (startup control condition) is satisfied at the timing t1, then the angle of lead is retarded to a predetermined angle θ1 (for example, a predetermined value smaller than 10° or approximately 7°). Then, after the predetermined angle θ1 is maintained for the start up control duration T2 described above (for example, for approximately 0.5 seconds as the time T2), the angle of lead is increased stepwise after the timing t2 to perform an ignition returning process. For example, the angle of lead is advanced by 0.7° for each 0.1 second. The centrifugal clutch 3 starts its connection at the timing t1', and the centrifugal clutch 3 is connected completely at a timing t2' after the ignition returning process described above. Accordingly, the centrifugal clutch 3 is in a slipping state after the timing t1' till the timing t2'.

Figure 5:
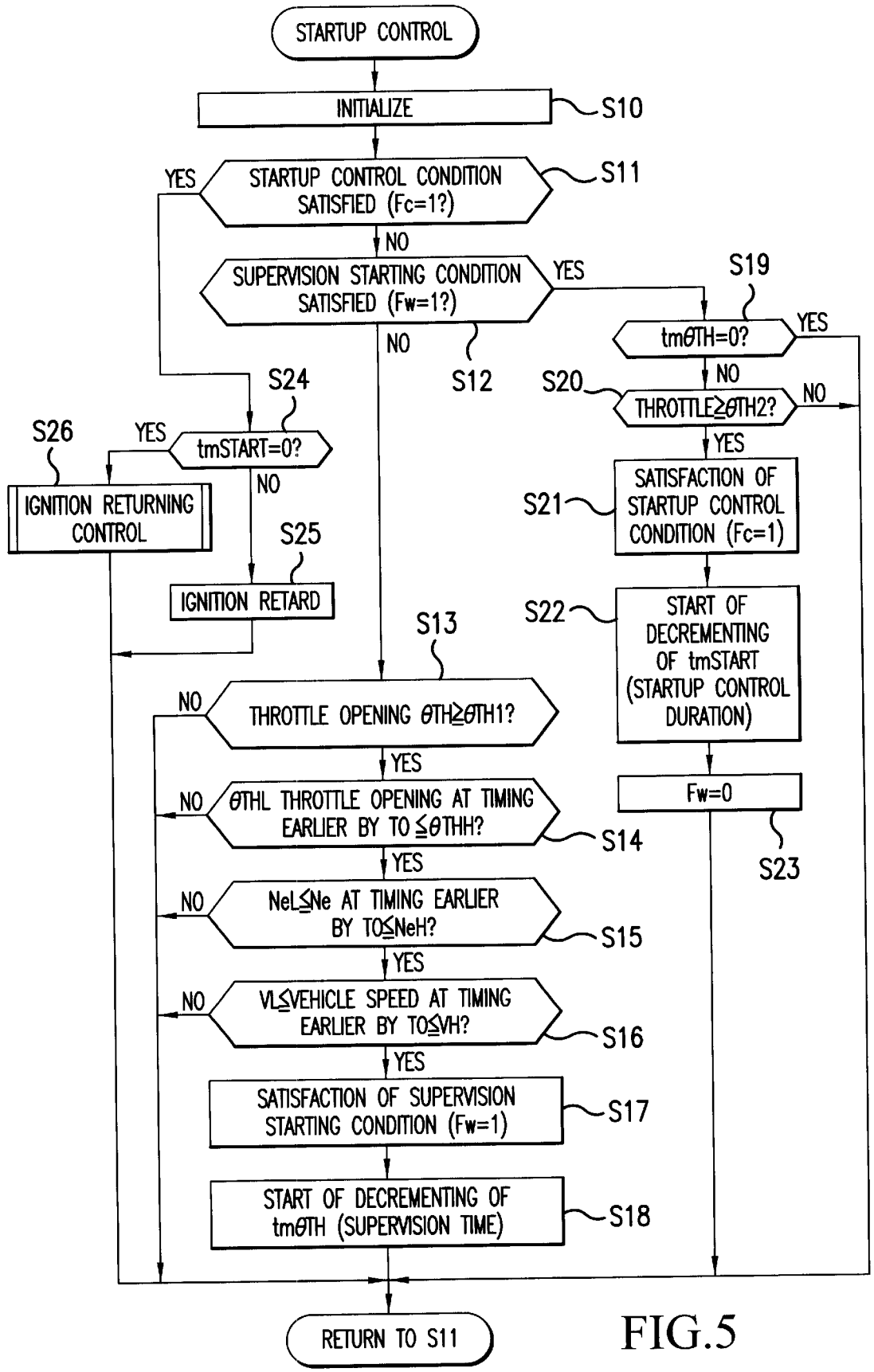
FIG. 5 is a detailed flow chart of the startup control.

Subsequently, the acceleration process described above is described with reference to a flow chart of FIG. 5. The process of this flow chart can be realized by a microcomputer. Referring to FIG. 5, in step S10, initialization (initialize) of the microcomputer including resetting of a flag which is set when the supervision starting condition is satisfied and another flag which is set when the startup control condition is satisfied is performed. In step S11, a startup control condition flag Fc is referred to to discriminate whether or not the startup control condition (second condition) is satisfied. Since the flag Fc initially is in a reset state, the processing advances to step S12, in which a supervision starting condition flag Fw is referred to to discriminate whether or not the supervision starting condition is satisfied. Since the flag Fw initially is in a reset state, the processing advances to step S13.

In step S13, it is discriminated whether or not the throttle opening θTH is equal to or higher than a reference value θTH1 with which supervision of satisfaction of the startup control condition is to be started. As an example, the reference value θTH1 described above is set to ten and several percent, or approximately 16%. In step S14, it is discriminated whether or not the throttle opening θTH at a timing earlier by the predetermined time To described above is within a range (between a reference value θTHL and another reference value θTHH, for example, by 30 milliseconds) for discrimination of satisfaction of the supervision starting condition. As an example, the reference value θTHH is set to 16% which is the same as that of the reference value θTHL and the reference value θTHL is set to 0%.

In step S15, it is discriminated whether or not the engine speed Ne at a timing earlier by the predetermined time To described above is within a range, for example 30 milliseconds (between a reference value NeL and another reference value NeH) for discrimination of satisfaction of the supervision starting condition. As an example, the reference value NeH is set to a predetermined value in the proximity of two to three thousand, for example approximately 2500 rpm, and the reference value NeL is set to several hundred, for example approximately 500 rpm.

Further, in step S16, it is discriminated whether or not the vehicle speed V at a timing earlier by the predetermined time To described above is within a range, for example approximately 30 milliseconds (between a reference value VL and another reference value VH) for discrimination of satisfaction of the supervision starting condition. As an example, the reference value VH is set to a value from several kilometers to ten and several kilometers per hour, for example approximately 10 km/hr, and the reference value VL is set to a value lower than several kilometers per hour, for example approximately 0 kmhr.

If the discriminations in steps S13 to S16 are all in the affirmative, then since it is discriminated that the supervision starting condition is satisfied, the processing advances to step S17, in which the supervision starting condition flag Fw is set. In step S18, timer means is started in order to measure the supervision time T1. In particular, decrementing of a counter tmTH to which a count value corresponding to the predetermined value T1 (for example, one second) is set is started. On the other hand, if any one of the discriminations in steps S13 to S16 is in the negative, then it is discriminated that the supervision starting condition is not satisfied, and the processing returns to step S11.

If the supervision starting condition is satisfied and the flag Fw is set, then the discrimination in step S12 changes to the affirmative, and the processing advances to step S19. In step S19, it is discriminated whether or not the counter tmTH is "0" to discriminate whether the supervision time T1 elapses or the present time is within the supervision time T1. If the present time is within the supervision time T1, then the processing advances to step S20, in which it is discriminated whether or not the throttle opening θTH is equal to or higher than the reference value to be used for discrimination of whether or not the startup control condition (second condition) is satisfied, that is, whether or not the throttle opening θTH is equal to or higher than the reference value θTH2 (>θTH1) which corresponds to a sudden opening. If it is discriminated that the throttle opening θTH indicates a sudden opening, then the processing advances to step S21, in which the startup control condition flag Fc is set. In step S22, timer means is started in order to measure the startup control duration T2. In other words, decrementing of a counter tmSTART to which a counter value corresponding to the startup control duration T2 described above a predetermined value (for example, 0.5 seconds) is set is started. In step S23, the supervision starting condition flag Fw is reset.

When the discrimination in step S20 is in the negative, that is, when the throttle opening θTH is lower than the reference value θTH2, or when the discrimination in step S19 is in the affirmative, that is, when the supervision time elapses before the throttle opening θTH reaches the reference value θTH2, the oscillation control condition is not satisfied, and the steps S21 to S23 are skipped.

After the startup control condition flag Fc is set, the discrimination in step S11 changes to the affirmative, and the processing advances to step S24. In step S24, it is discriminated whether or not the counter tmSTART is "0" to discriminate whether or not the startup control duration T2 elapses. If the counter tmSTART is not "0", then the processing advances to step S25, in which ignition regard is performed, that is, the ignition timing is set to a timing retarded from that in normal operation. Consequently, the output power is limited, and sudden acceleration upon starting is suppressed. The ignition regard is maintained until the counter tmSTART becomes equal to "0". After the counter tmSTART becomes equal to "0", the processing advances to step S26, in which the ignition returning process, that is, a process for advancing the angle of lead stepwise, is executed.

As described above, according to the present embodiment, when an operation for sudden acceleration is detected within the supervision time T1 after the first condition indicative of startup is detected, the ignition timing can be retarded prior to the connection of the centrifugal clutch thereby to limit the output power of the engine 1 to suppress sudden acceleration.

It is to be noted that the present embodiment is a working example of the present invention and can be modified in various manners. For example, the discrimination of establishment of the first condition may be performed not with regard to all of the vehicle speed V, throttle opening θTH and engine speed Ne, but with regard to a selective combination of at least two of them. Further, also the ignition timing retard amount, various timer values, reference values for the throttle opening, returning speed in the ignition timing returning process and so forth are not limited to those given hereinabove but can be modified in various manners taking an applied vehicle, conditions of use and so forth into consideration.

As is apparent from the foregoing description, according to the present invention, the operating stability upon startup can be improved. Particularly, since sudden acceleration which may possibly occur in the beginning of the connection of the centrifugal clutch can be prevented by detecting a sudden opening of the throttle before connection of the centrifugal clutch and starting ignition timing retard, the operating stability can be improved, and the comfortability in riding can be improved. Particularly, with a vehicle of the saddle type for which smooth starting upon startup is required, the comfortability in riding is improved significantly.

Further, since a sudden connection of the centrifugal clutch can be prevented, the durability of the centrifugal clutch is improved, and also the operability for adjustment of the throttle opening is augmented. Furthermore, since it is not necessary to provide a sensor for exclusive use for detecting sudden acceleration, the cost by addition of a sensor does not occur. Further, since it is not necessary to assure the installation space as well, the degree of freedom in designing increases.

In addition, since not only the miniaturization of the clutch is possible but also a sudden acceleration can be moderated from a half-clutch state which appears notably where a dry type centrifugal clutch is adopted. The miniaturization of the clutch and the prevention of a sudden acceleration can be achieved simultaneously.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An accelerator controlling apparatus for a vehicle comprising:

supervision means for starting supervision of sudden acceleration when predetermined conditions corresponding to a start up of said vehicle are satisfied with regard to at least two from among a vehicle speed, a throttle opening and an engine speed;

a centrifugal clutch for interrupting driving force transmission between an engine and a driving wheel in response to the engine speed; and acceleration control means for limiting engine output power when the throttle opening during a period of the supervision by said supervision means reaches a predetermined value corresponding to sudden acceleration;

wherein the engine speed, which is one of the predetermined conditions for the startup, is set to a low speed region lower than a value at which said centrifugal clutch is connected.

2. The acceleration control apparatus for a vehicle according to claim 1, wherein said acceleration control means is an ignition retard means for setting an ignition timing of a small angle of lead and for maintaining the ignition timing for a predetermined period of time.

3. The acceleration control apparatus for a vehicle according to claim 2, and further including ignition timing returning means for returning the ignition timing of the small angle of lead set by said ignition retard means stepwise to a normal ignition timing after lapse of the predetermined period of time.

4. The acceleration control apparatus for a vehicle according to claim 1, wherein the vehicle is a saddle type vehicle.

5. The acceleration control apparatus for a vehicle according to claim 2, wherein the vehicle is a saddle type vehicle.

6. The acceleration control apparatus for a vehicle according to claim 3, wherein the vehicle is a saddle type vehicle.

7. The acceleration control apparatus for a vehicle according to claim 1, wherein the centrifugal clutch is a dry type centrifugal clutch.

8. The acceleration control apparatus for a vehicle according to claim 2, wherein the centrifugal clutch is a dry type centrifugal clutch.

9. The acceleration control apparatus for a vehicle according to claim 3, wherein the centrifugal clutch is a dry type centrifugal clutch.

10. The acceleration control apparatus for a vehicle according to claim 4, wherein the centrifugal clutch is a dry type centrifugal clutch.

11. An accelerator controlling apparatus for a vehicle comprising:

supervision means for reviewing sudden acceleration corresponding to a start up of said vehicle with regard to at least two parameters selected from the group consisting of a vehicle speed, a throttle opening and an engine speed;

a centrifugal clutch for selectively providing a driving force transmission between an engine and a driving wheel in response to the engine speed; and acceleration control means for limiting engine output power when the throttle opening during a period of the review by said supervision means reaches a predetermined value corresponding to sudden acceleration;

wherein the engine speed, which is one of the predetermined conditions for the startup, is set to a low speed region lower than a value at which said centrifugal clutch is connected during such conditions.

12. The acceleration control apparatus for a vehicle according to claim 11, wherein said acceleration control means is an ignition retard means for setting an ignition timing of a small angle of lead and for maintaining the ignition timing for a predetermined period of time.

13. The acceleration control apparatus for a vehicle according to claim 12, and further including ignition timing returning means for returning the ignition timing of the small angle of lead set by said ignition retard means stepwise to a normal ignition timing after lapse of the predetermined period of time.

14. The acceleration control apparatus for a vehicle according to claim 11, wherein the vehicle is a saddle type vehicle.

15. The acceleration control apparatus for a vehicle according to claim 12, wherein the vehicle is a saddle type vehicle.

16. The acceleration control apparatus for a vehicle according to claim 13, wherein the vehicle is a saddle type vehicle.

17. The acceleration control apparatus for a vehicle according to claim 11, wherein the centrifugal clutch is a dry type centrifugal clutch.

18. The acceleration control apparatus for a vehicle according to claim 12, wherein the centrifugal clutch is a dry type centrifugal clutch.

19. The acceleration control apparatus for a vehicle according to claim 13, wherein the centrifugal clutch is a dry type centrifugal clutch.

20. The acceleration control apparatus for a vehicle according to claim 14, wherein the centrifugal clutch is a dry type centrifugal clutch.

* * * * *